(12) United States Patent
Arn

(10) Patent No.: US 8,910,053 B2
(45) Date of Patent: Dec. 9, 2014

(54) MOBILE TERMINAL, ELECTRONIC SYSTEM AND METHOD OF TRANSMITTING AND RECEIVING DATA USING THE SAME

(75) Inventor: Seongjun Arn, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 13/015,347

(22) Filed: Jan. 27, 2011

(65) Prior Publication Data

US 2012/0070085 A1   Mar. 22, 2012

(30) Foreign Application Priority Data

Sep. 16, 2010   (KR) ........................ 10-2010-0091201

(51) Int. Cl.
| | | |
|---|---|---|
| G06F 13/00 | (2006.01) | |
| G06F 15/00 | (2006.01) | |
| H04N 7/18 | (2006.01) | |
| H04N 21/482 | (2011.01) | |
| H04N 21/41 | (2011.01) | |

(52) U.S. Cl.
CPC ............. *H04N 7/185* (2013.01); *H04N 21/482* (2013.01); *H04N 21/4126* (2013.01)
USPC ............................................. 715/744; 455/95

(58) Field of Classification Search
USPC .......................... 715/863, 810, 773, 865, 702
See application file for complete search history.

(56) References Cited

U.S. PATENT DOCUMENTS

| | | | | |
|---|---|---|---|---|
| 7,720,436 | B2* | 5/2010 | Hamynen et al. | 455/13.1 |
| 8,365,099 | B2* | 1/2013 | Cho et al. | 715/863 |
| 2007/0283296 | A1 | 12/2007 | Nilsson | |
| 2009/0294538 | A1* | 12/2009 | Wihlborg et al. | 235/454 |
| 2011/0037777 | A1* | 2/2011 | Lindahl et al. | 345/619 |

FOREIGN PATENT DOCUMENTS

| | | |
|---|---|---|
| CN | 101073050 | 11/2007 |
| CN | 101242509 | 8/2008 |
| WO | 2007/080473 | 7/2007 |
| WO | 2009/114536 | 12/2009 |

OTHER PUBLICATIONS

The State Intellectual Property Office of the People's Republic of China Application Serial No. 201110072590.5, Office Action dated Jul. 2, 2013, 8 pages.
European Patent Office Application Serial No. 11180315.1, Search Report dated Aug. 27, 2013, 5 pages.

\* cited by examiner

*Primary Examiner* — Kevin Nguyen
(74) *Attorney, Agent, or Firm* — Lee, Hong, Degerman, Kang & Waimey

(57) ABSTRACT

Provided are a mobile terminal, an electronic system, and a method of transmitting and receiving data using the same for effectively transmitting and receiving data between the mobile terminal and external electronic devices.

20 Claims, 15 Drawing Sheets

MOBILE TERMINAL, ELECTRONIC SYSTEM AND METHOD OF TRANSMITTING AND RECEIVING DATA USING THE SAME

Pursuant to 35 U.S.C. §119(a), this application claims the benefit of earlier filing date and right of priority to Korean Application No. 10-2010-0091201, filed on Sep. 16, 2010, the contents of which is hereby incorporated by reference herein in its entirety.

BACKGROUND

1. Field

This document relates to a mobile terminal and an external electronic device, and more particularly, to transmission and receiving of data between the mobile terminal and the external electronic device.

2. Related Art

Recent technological development has realized smooth data transmission and receiving between a mobile terminal and a variety of electronic devices.

However, conventional methods of transmitting and receiving data between a mobile terminal and an external electronic device required a user to operate multi-stage operations or perform complicate setting, and thus it was inconvenient for the user to use the mobile terminal

SUMMARY

An aspect of this document is to provide a mobile terminal, an electronic system and a method of transmitting and receiving data using the same for effectively transmitting and receiving data between the mobile terminal and external electronic devices.

In an aspect, there is provided a mobile terminal comprising a camera adapted to capture images, and a controller configured to receive a signal to select a specific object included in an image captured via the camera from a screen of an external electronic device, and to receive a file from the external electronic device that is related to the selected specific object.

In another aspect, there is provided a mobile terminal comprising a camera configured to capture images, and a controller configured to receive a file from an external electronic device when an image of a screen of the external electronic device is captured via the camera, the file related to contents or an application that is executed or activated in the external electronic device.

In another aspect, there is provided a method of receiving data in a mobile terminal, the method comprising capturing an image of a screen of an external electronic device via a camera, receiving a signal to select a specific object included in the captured image, and receiving a file related to the selected specific object from the external electronic device.

In another aspect, there is provided a method of receiving data in a mobile terminal, the method comprising capturing an image of a screen of an external electronic device via a camera, and receiving a file from the external electronic device when the image of the screen of the external electronic device is captured, the file related to contents or an application that is executed or activated in the external electronic device.

In another aspect, there is provided a method of transmitting and receiving data in an electronic system including a mobile terminal and an electronic device, the method comprising capturing, by the mobile terminal, an image of a screen of the electronic device, receiving, by the mobile terminal, a signal for selecting a specific object included in the captured image, transmitting, by the mobile terminal, information related to the selected specific object to the electronic device, the information comprising at least selection information related to the selected specific object or the captured image, specifying, by the electronic device, data related to the selected specific object by using the information related to the selected specific object, transmitting, by the electronic device, the specified data to the mobile terminal, and receiving and storing, by the mobile terminal, the specified data.

In another aspect, there is provided a method of transmitting and receiving data in an electronic system including a mobile terminal and an electronic device, the method comprising capturing, by the mobile terminal, an image of a screen of the electronic device, notifying the electronic device, by the mobile terminal, that the image is captured, specifying, by the electronic device, data related to contents or an application that is executed or activated in the electronic device, transmitting, by the electronic device, the specified data to the mobile terminal, and receiving and storing, by the mobile terminal, the specified data.

According to the mobile terminal, the electronic system and the method of transmitting and receiving data using the same, data can be easily transmitted and received between the mobile terminal and an external electronic device.

BRIEF DESCRIPTION OF THE DRAWINGS

The implementation of this document will be described in detail with reference to the following drawings in which like numerals refer to like elements.

DETAILED DESCRIPTION

Hereinafter, implementations of this document will be described in detail with reference to the attached drawings.

Hereinafter, a mobile terminal relating to this document will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
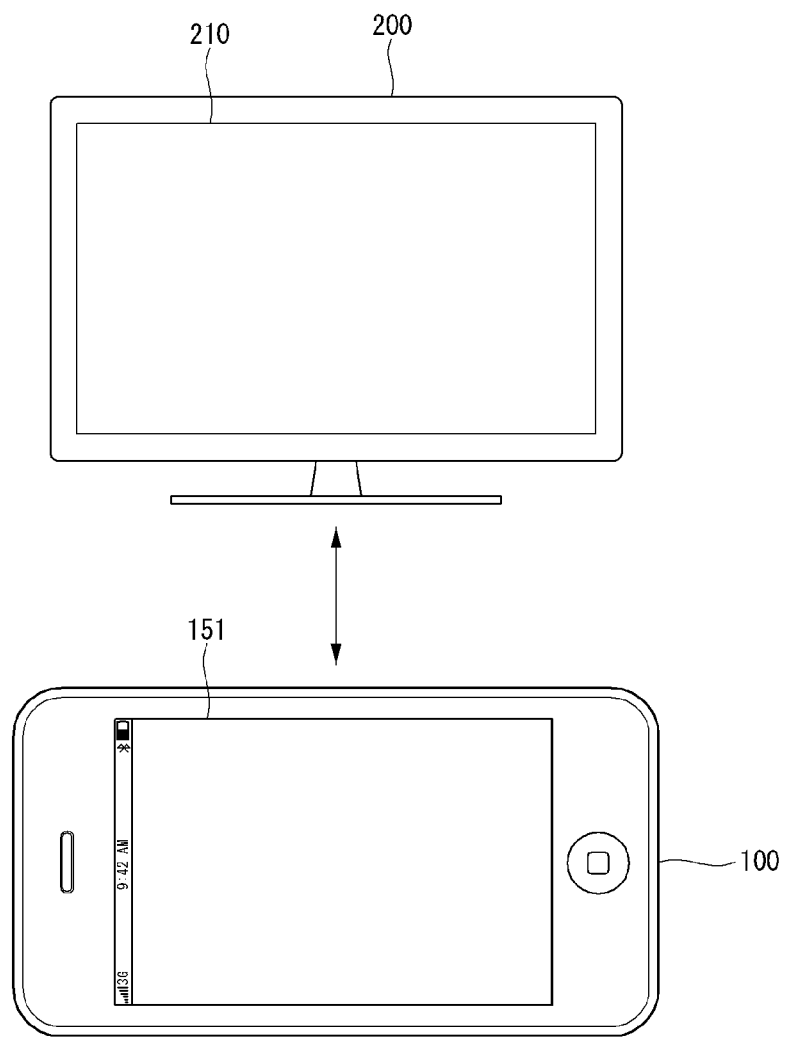
FIG. 1 illustrates a system environment to which this document is applied.

FIG. 1 illustrates a system environment to which this document is applied.

Referring to FIG. 1, the system environment may include a mobile terminal 100 having a display unit 151 and an electronic device 200 having a display unit 210.

The mobile terminal 100 and the electronic device 200 can communicate with each other through a wireless or wired communication method.

The communication method by which the mobile terminal 100 and the electronic device 200 communicate with each other is not limited in this document. The technical spirit of this document can be applied to all the existing wireless communication methods and all of communication methods which will appear.

For example, the mobile terminal 100 and the electronic device 200 can communicate with each other according to communication methods such as Universal Plug and Play (UPnP), digital living network alliance (DLNA), WiFi, local area communication, etc.

The mobile terminal 100 may include a cellular phone, a smart phone, a digital broadcasting terminal, PDA, PMP, a navigation system, a mobile Internet device (MID), etc.

The electronic device 200 may include a computer, a laptop computer, digital TV, IPTV, etc.

Figure 2:
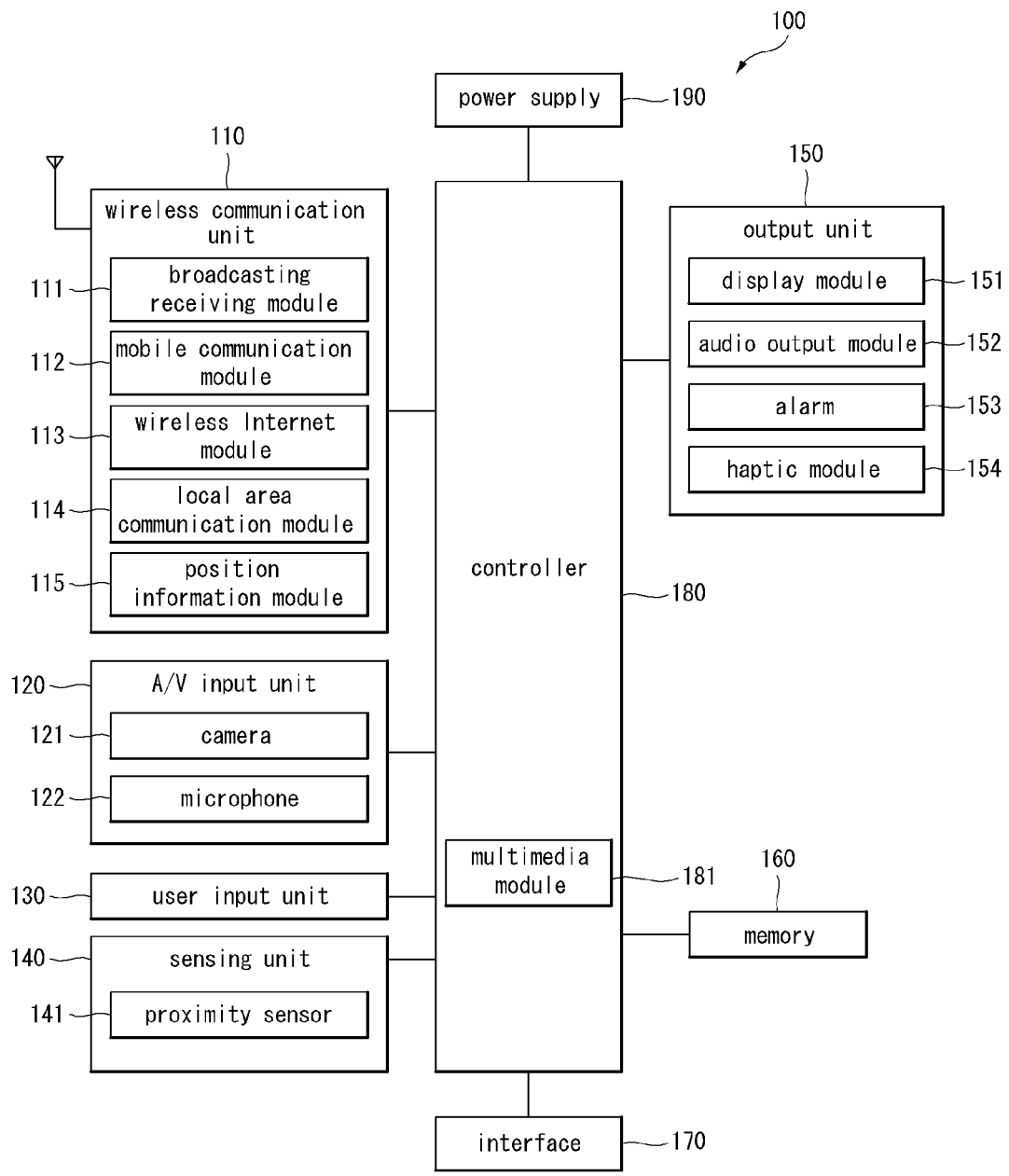
FIG. 2 is a block diagram of a mobile terminal related to an implementation of this document.

FIG. 2 is a block diagram of the mobile terminal 100 relating to an implementation of this document. The mobile terminal 100 can include a wireless communication unit 110, an audio/video (A/V) input unit 120, a user input unit 130, a sensing unit 140, an output unit 150, a memory 160, an interface 170, a controller 180, and a power supply 190. The components shown in FIG. 2 are not essential parts and the number of components included in the mobile terminal can be varied.

The components of the mobile terminal 100 will now be described.

The wireless communication unit 110 can include at least one module that enables wireless communication between the mobile terminal 100 and a wireless communication system or between the mobile terminal 100 and a network in which the mobile terminal 100 is located. For example, the wireless communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 2, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the wireless communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays user interface (UI) or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 2, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor 141 includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor 141 senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of this document can be implemented in a computer or similar device readable recording medium using software, hardware or a combination thereof, for example.

According to hardware implementation, the embodiments of this document can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 3:
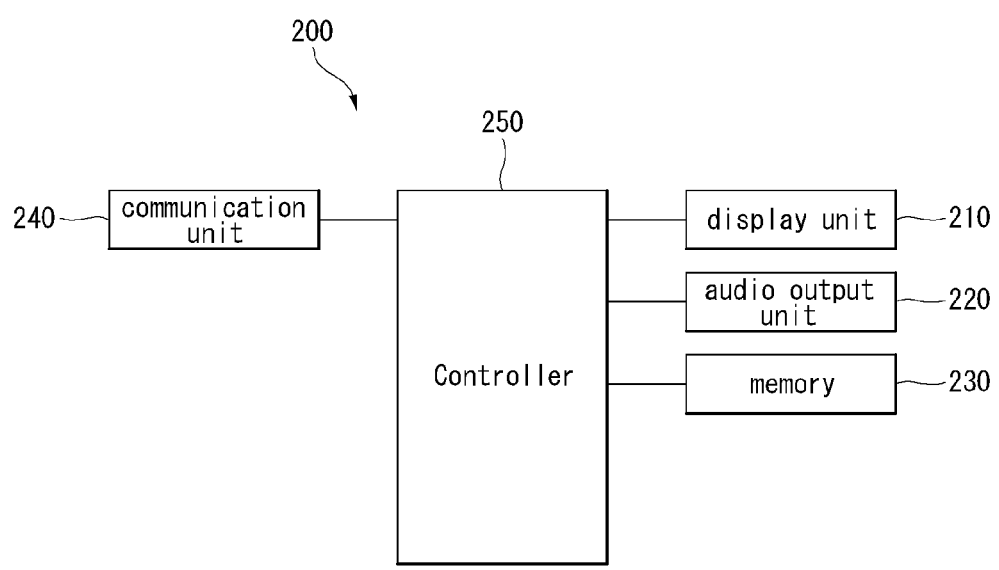
FIG. 3 is a block diagram of an electronic device related to an implementation of this document.

FIG. 3 is a block diagram of the electronic device 200 related to an implementation of this document.

Referring to FIG. 3, the electronic device 200 can include the display unit 210, an audio output unit 220, a memory 230, a communication unit 240, and a controller 250.

The display unit 210, the audio output unit 220, the memory 230, the communication unit 240, and the controller 250 can perform functions identical/similar to those of the corresponding components of the mobile terminal 100.

It is assumed that the display unit 151 of the mobile terminal 100 is a touch screen in this document for convenience of explanation. As described above, the touch screen 151 can perform both an information displaying function and an information inputting function. However, implementations of this document are limited thereto. A touch mentioned in this document can include both a contact touch and a proximity touch.

Figure 4:
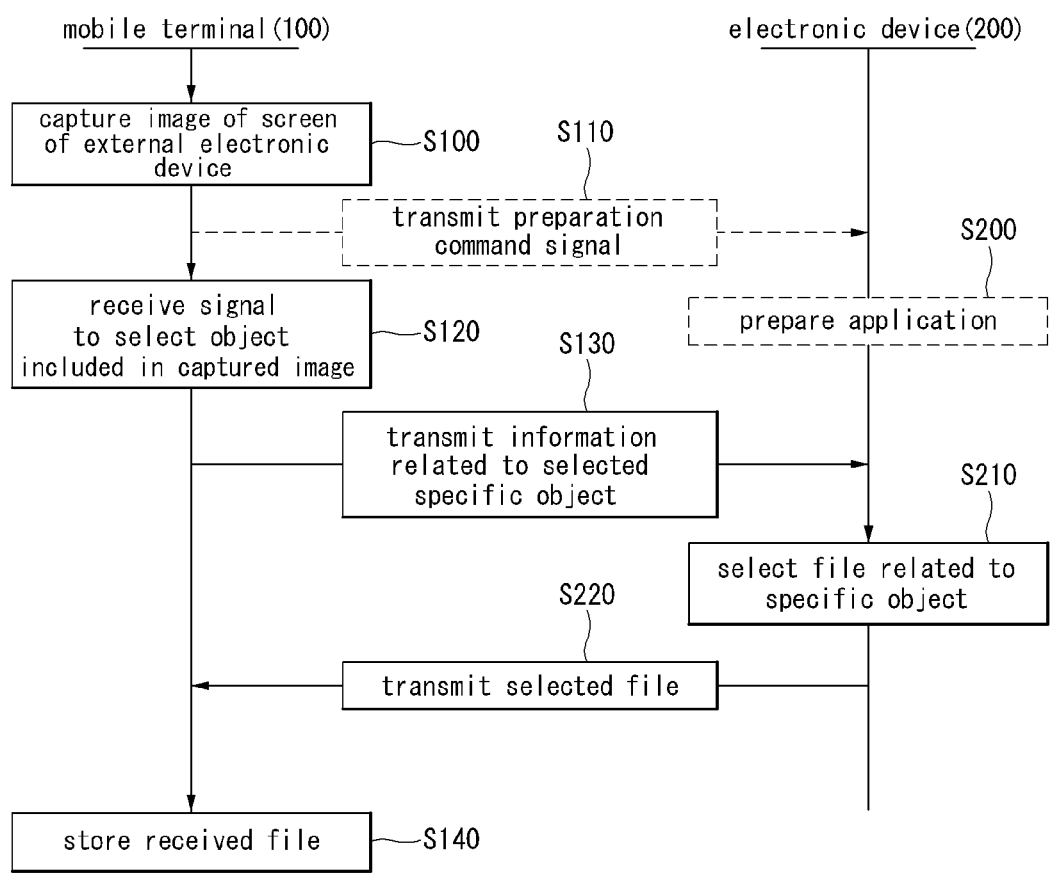
FIG. 4 is a flowchart illustrating an implementation of a method of transmitting and receiving data of this document.

FIG. 4 is a flowchart illustrating an implementation of a method of transmitting and receiving data of this document and FIGS. 5 through 13 are views for explaining the method of transmitting and receiving data shown in FIG. 4.

The method of transmitting and receiving data shown in FIG. 4 may be implemented in the system environment including the mobile terminal 100 and the electronic device 200, described above with reference to FIGS. 1, 2 and 3. The method of transmitting and receiving data and the operations of the mobile terminal 100 and the electronic device 200 for implementing the method will now be explained in detail.

Figure 5:
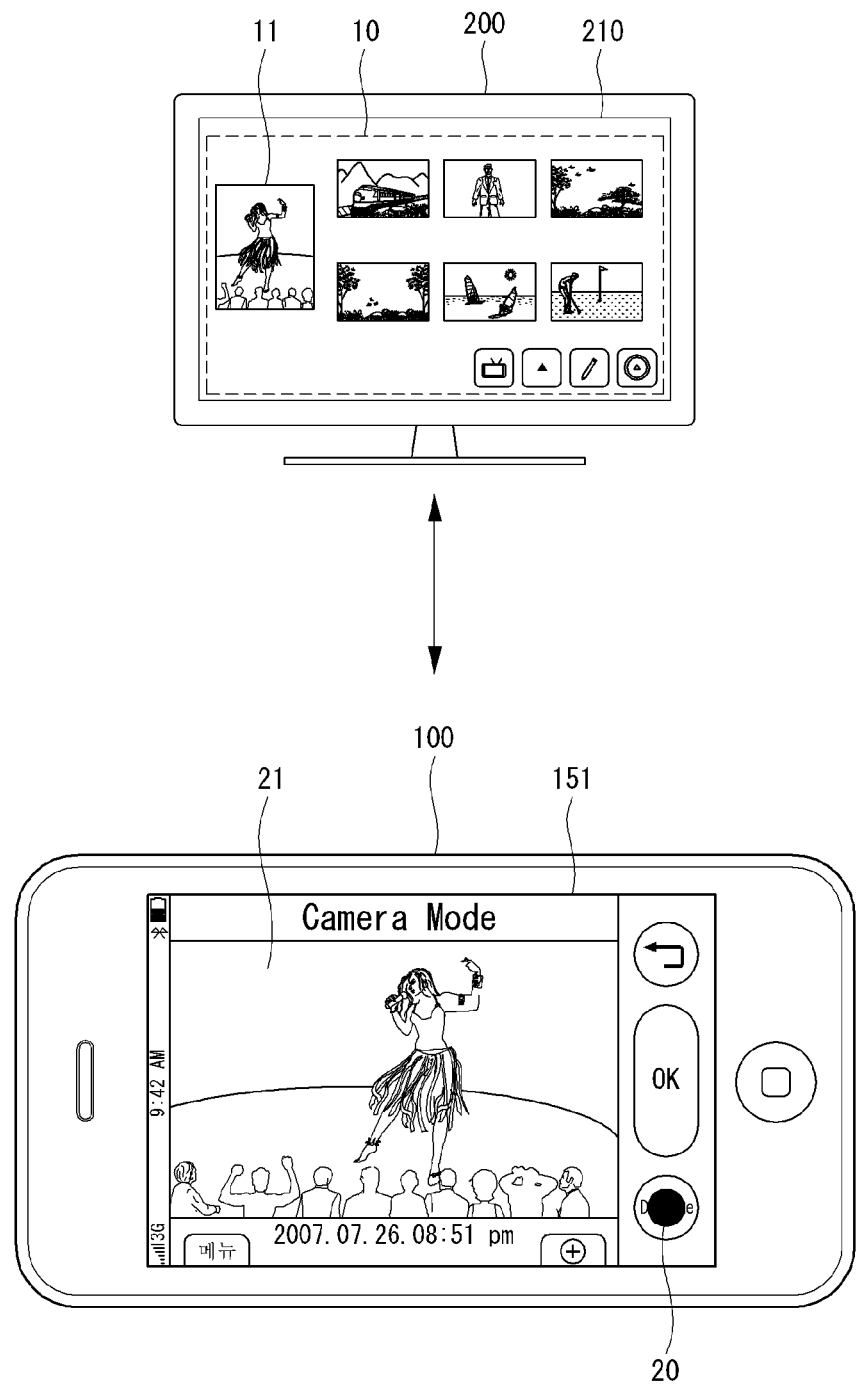
FIGS. 5 through 13 are views for explaining the method of transmitting and receiving data shown in FIG. 4.

The mobile terminal 100 may capture an image of the screen of the external electronic device 200 in operation S100. FIG. 5 illustrates an implementation of the operation S100.

Referring to FIG. 5, the controller 180 of the mobile terminal 100 may drive the camera 121 when a user operates a menu to display a camera preview screen on the touch screen 151.

The controller 180 may provide a soft key 20 for starting a predetermined function according to this implementation through the preview screen. The soft key 20 may have a form as shown in FIG. 5 or a slide bar shape. The soft key 20 shown in FIG. 5 is exemplary and a user interface for starting the predetermined function according to this implementation is not limited to the soft key 20.

For example, the predetermined function can be started only when the soft key 20 and a specific key included in the user input unit 130 are simultaneously selected.

When the user touches the soft key 20, the controller 180 performs the operation S100 to start the predetermined function.

For example, the controller 180 can capture the image currently displayed on the preview screen of the touch screen 151 shown in FIG. 5 as an image file when the soft key 20 is touched.

The user may display at least part of an image displayed on the display unit 210 of the electronic device 200 on the preview screen and capture a desired image.

In FIG. 5, the display unit 210 of the electronic device 200 displays multiple objects. When the user displays a specific object 11 among the multiple objects on the preview screen of the touch screen 151 and touches the soft key 20, the controller 180 can capture the image of the specific object 11 displayed on the preview screen.

Figure 6:
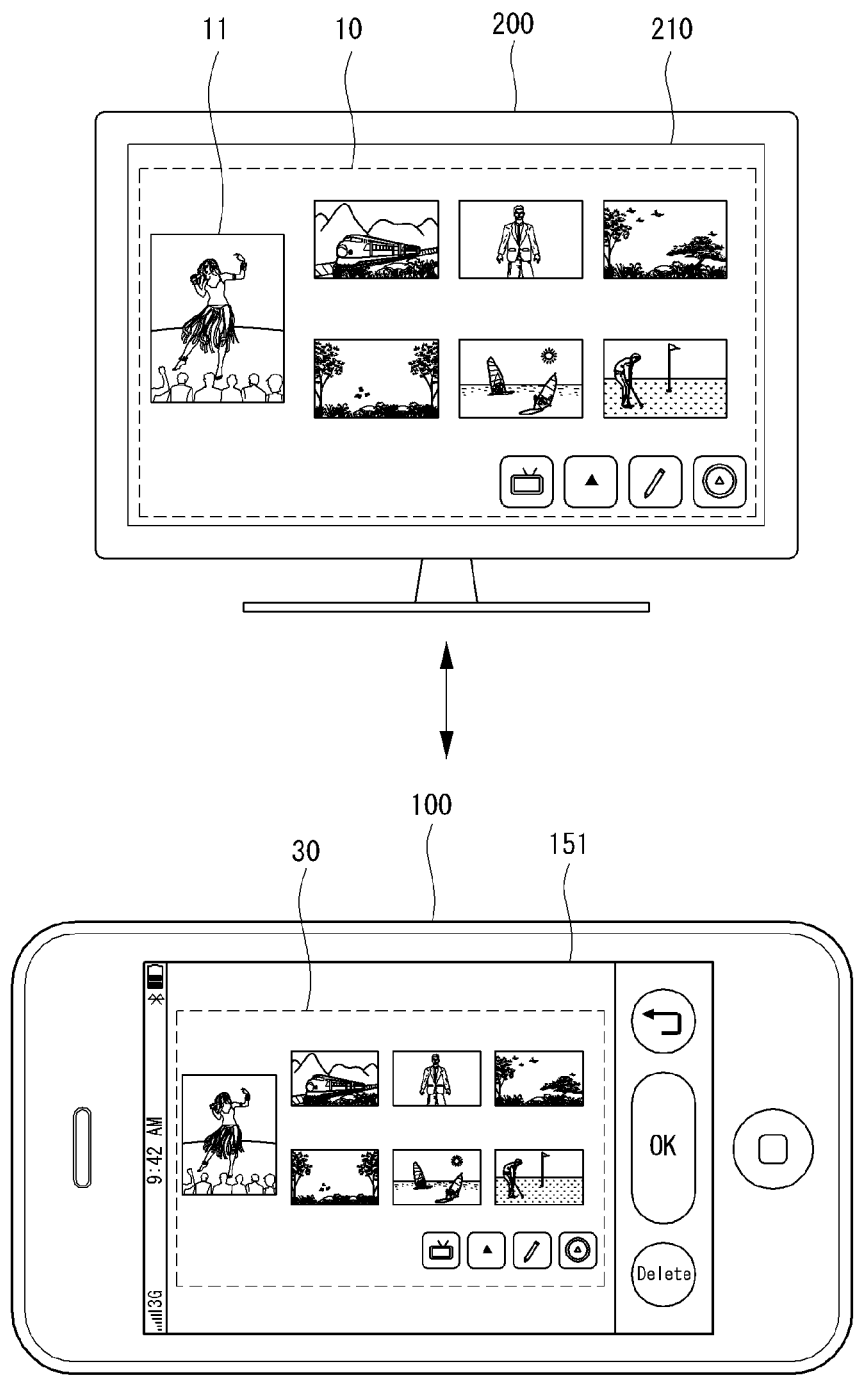

Referring to FIG. 6, the controller 180 can capture an image including all the objects displayed on the display unit 210 of the electronic device 200.

The mobile terminal 100 may transmit a preparation command signal for commanding preparation to execute an application related to this implementation to the electronic device 200 when the image is captured or the soft key 20 is touched in operation S110. The electronic device 200 may execute the application or prepare to execute the application when receiving the preparation command signal from the mobile terminal 100 in operation S200.

The operations 110 and 200 may be omitted.

The mobile terminal 100 may receive a signal for selecting a specific object included in the captured image from the user in operation S120. The controller 180 of the mobile terminal 100 may provide various selection tools or user selection interfaces for selecting the specific object.

Figure 7:
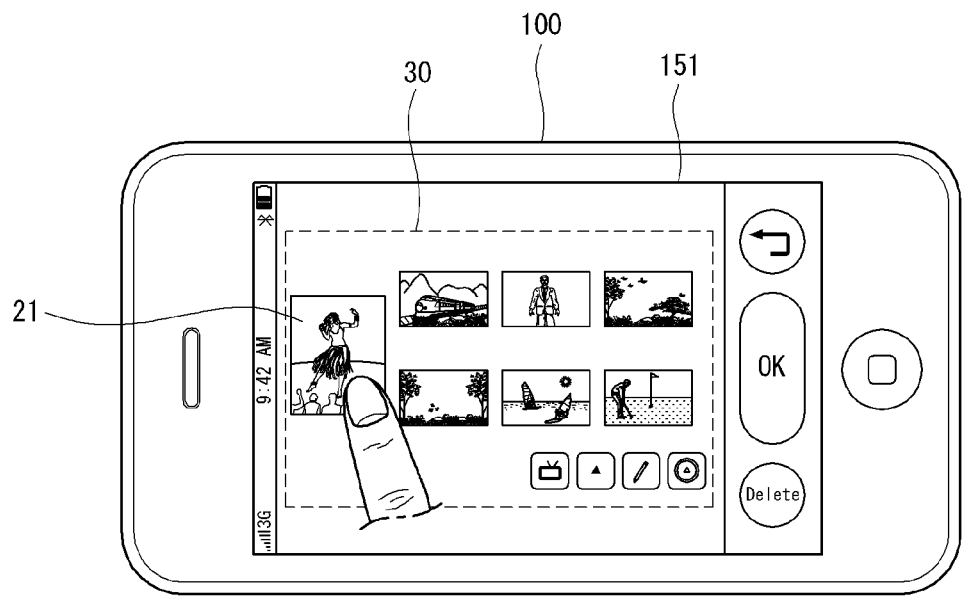

Referring to FIG. 7, the controller 180 can receive a selection signal according to a touch applied to a specific object 21 included in the image displayed on the touch screen 151 of the mobile terminal 100.

The controller 180 may recognize the object included in the displayed image using an object recognition algorithm. Accordingly, if a point touched by a user's finger corresponds to the point where the specific object 21 is displayed, the controller 180 can select the specific object 21.

Figure 8:
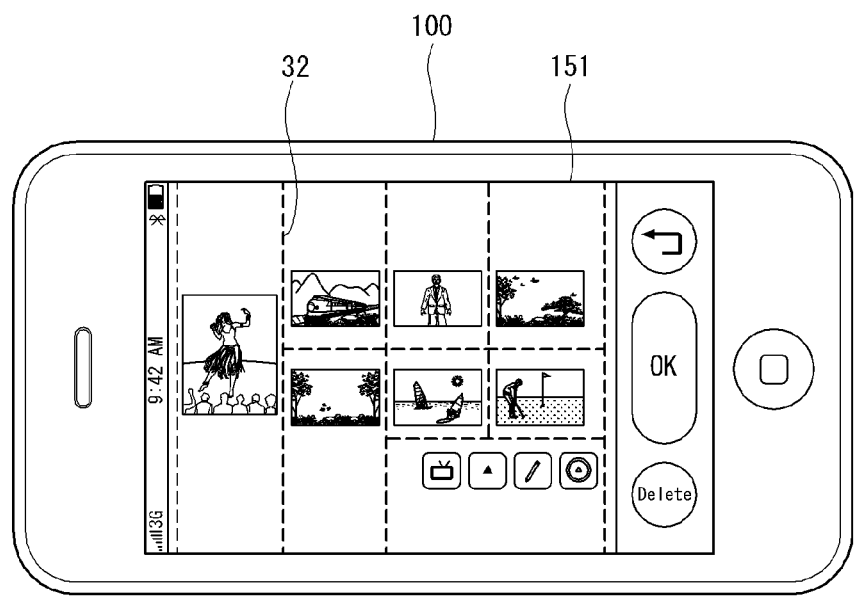

Referring to FIG. 8, the controller 180 can recognize the object included in the image acquired in the operation S100 and divide the image into multiple regions based on the recognized object. Reference numeral 32 represents an indicating line for segmenting the image into the multiple regions. The user can easily select a desired object with reference to the indicating line 32. Furthermore, the controller 180 may respectively provide check boxes for a user's choice in the regions divided by the indicating line 32.

Figure 9:
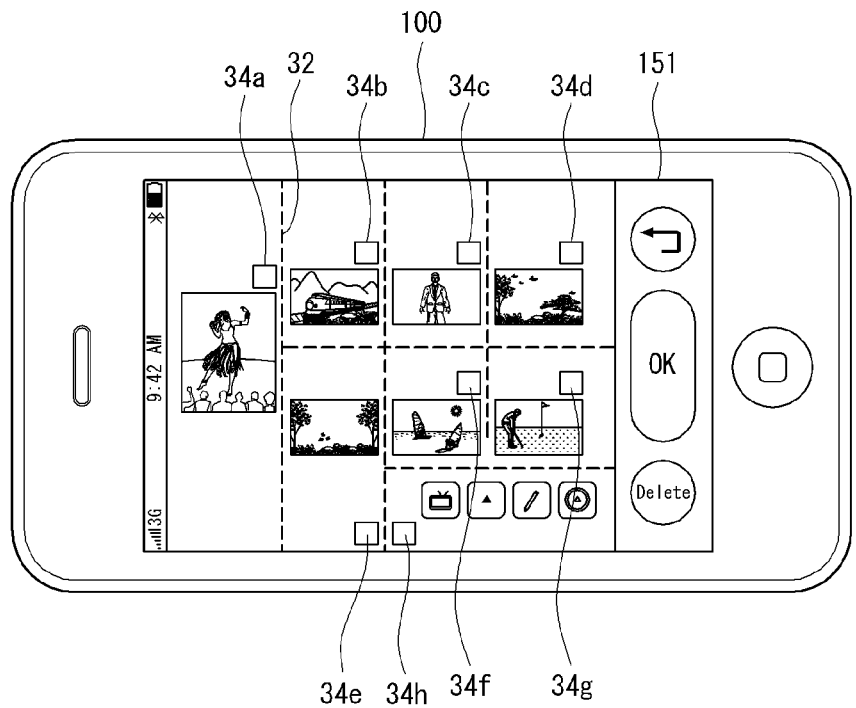

Referring to FIG. 9, the controller 180 may respectively provide check boxes 34a, 34b, 34c, 34d, 34e, 34f, 34g and 34h to the regions divided by the indicating line 32. The user may touch at least one of the check boxes 34a, 34b, 34c, 34d, 34e, 34f, 34g and 34h to select at least one object.

The user may input a touch trace forming a looped curve corresponding to a desired object through the touch screen 151.

Figure 10:
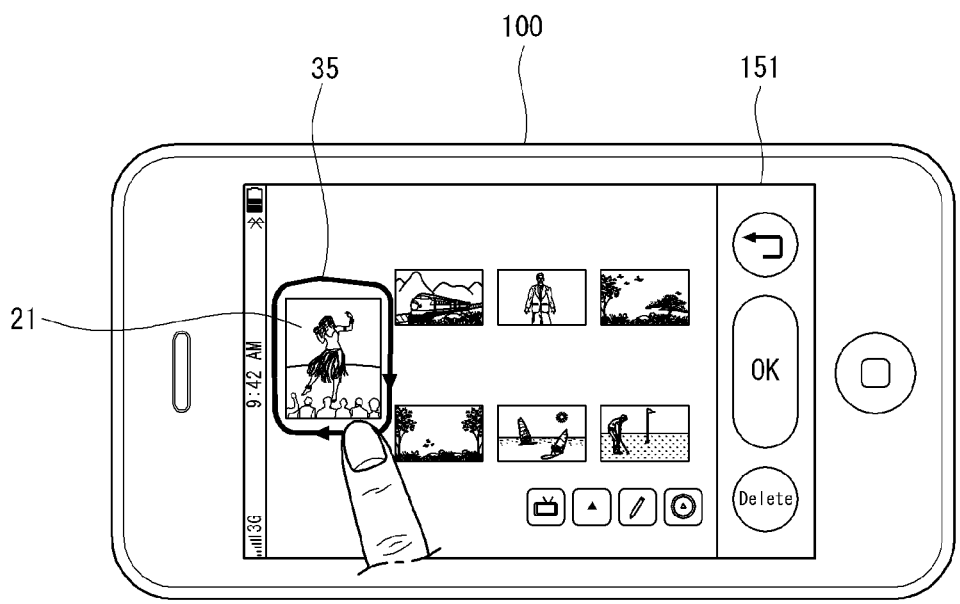

Referring to FIG. 10, when the user forms a looped curve 35 on the touch screen 151 with his finger, the controller 180 can select the specific object 21 included in the looped curve 35.

Here, the looped curve does not have to completely include the specific object 21. When the controller 180 receives a touch trace forming a looped curve from the user, the controller 180 can select an object that occupies a largest portion of the looped curve.

The mobile terminal 100 may transmit information related to the selected specific object to the electronic device 200 in operation S130.

The information related to the selected specific object may include at least one of an image and text. For example, the information related to the selected specific object can include at least one of the image captured in the operation S100 and the image of the specific object in the captured image.

When the controller 180 of the mobile terminal 100 can obtain identification information for identifying the specific object, the controller 180 can transmit the identification information to the electronic device 200.

The identification information includes all information that can display or represent the specific object. For example, the identification information may be the image of the specific object and/or QR code (Quick Response Code) or a smart tag representing the image captured in the operation S100.

If the image captured in the operation S100 includes text, such as the title or description of the specific object, the controller 180 may recognize the text and transmit the recognized text to the electronic device 200 as the information related to the specific object.

The electronic device 200 may receive the information related to the specific object from the mobile terminal 100 and select a file related to the specific object with reference to the information related to the specific object in operation S210. For example, if the controller 250 of the electronic device 200 receives an image as the information related to the specific object from the mobile terminal 100, the controller 250 can compare the image to an image displayed on the display unit 210 or image files stored in the memory 230 to select a file related to the specific object. If the controller 250 of the electronic device 200 receives a text as the information related to the specific object from the mobile terminal 100, the controller 250 can select a file corresponding to the text as a file related to the specific object. The file related to the specific object, selected by the controller 250, may include a text file, an image file, a video file, a memo, a web page related file, etc. Furthermore, the controller 250 may select an application file as a file related to the specific object.

The electronic device 200 may transmit the selected file to the mobile terminal 100 in operation S220.

The mobile terminal 100 may receive the file from the electronic device 200 and store the received file in operation S140.

Here, the controller 180 of the mobile terminal 100 may provide an indicator and/or related information for notifying the user of the receiving state of the file transmitted from the electronic device 200 to the user visually and/or auditorily.

The file received from the electronic device 200 may be temporarily or permanently stored in the memory 160. When the file is temporarily stored in the memory 160, the user may select one of permanent storage and deletion.

The controller 180 may store at least one of the image captured in the operation S100 and the file received from the electronic device 200.

Figure 11:
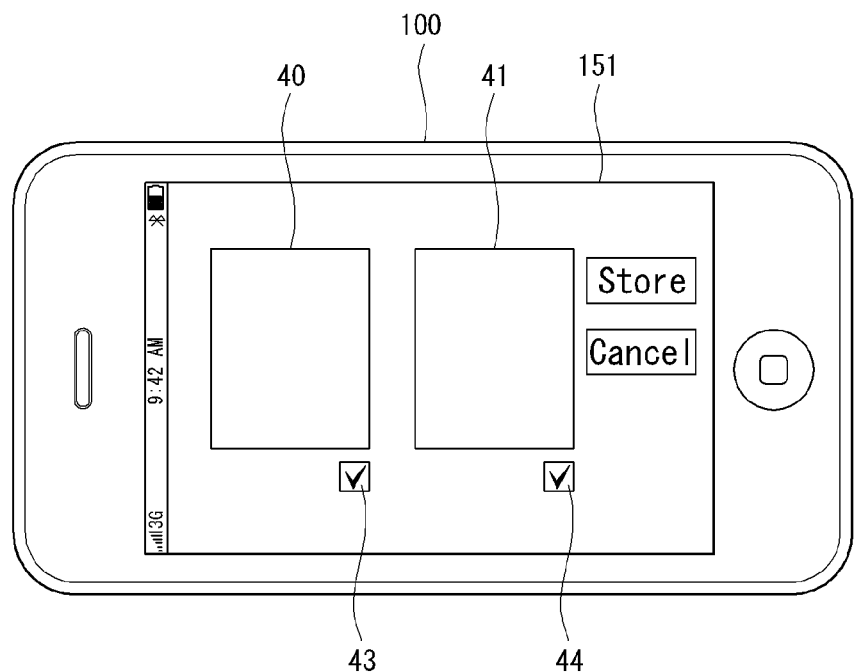

When the controller 180 receives the file from the electronic device 200 in the operation 220, the controller 180 may display the image 40 captured in the operation S100 and the received file or an object 41 representing the received file on the touch screen 151, as shown in FIG. 11. In addition, the controller 180 may display a first check box 43 for selecting storage of the captured image 40 and a second check box 44 for selecting storage of the object 41. The user may select at least one of the captured image 40 and the object 41 using the first and second check boxes 43 and 44 and press a soft key <Store> to store the selected object.

Figure 12:
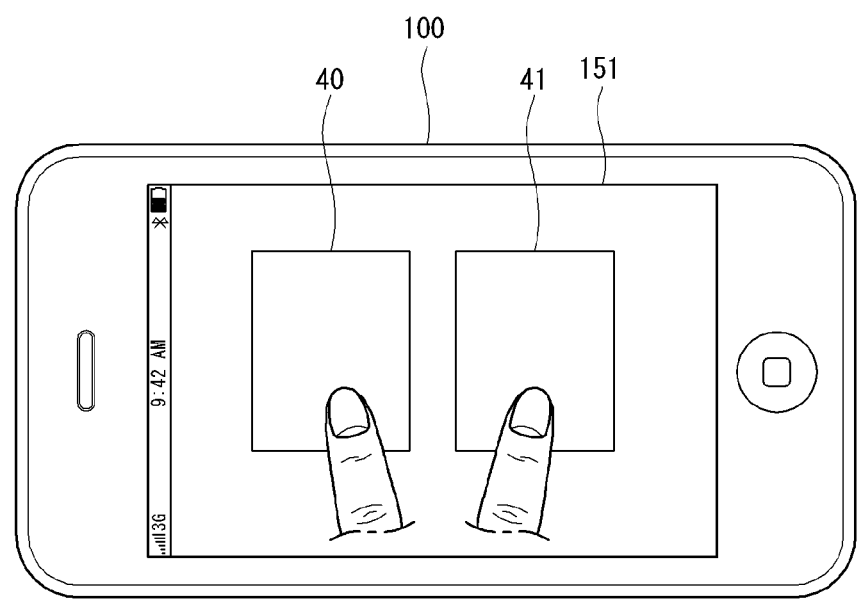

Referring to FIG. 12, when the user simultaneously multi-touches the image 40 and the object 41, the controller 180 can store both the image 40 and the object 41 in the memory 160.

Figure 13:
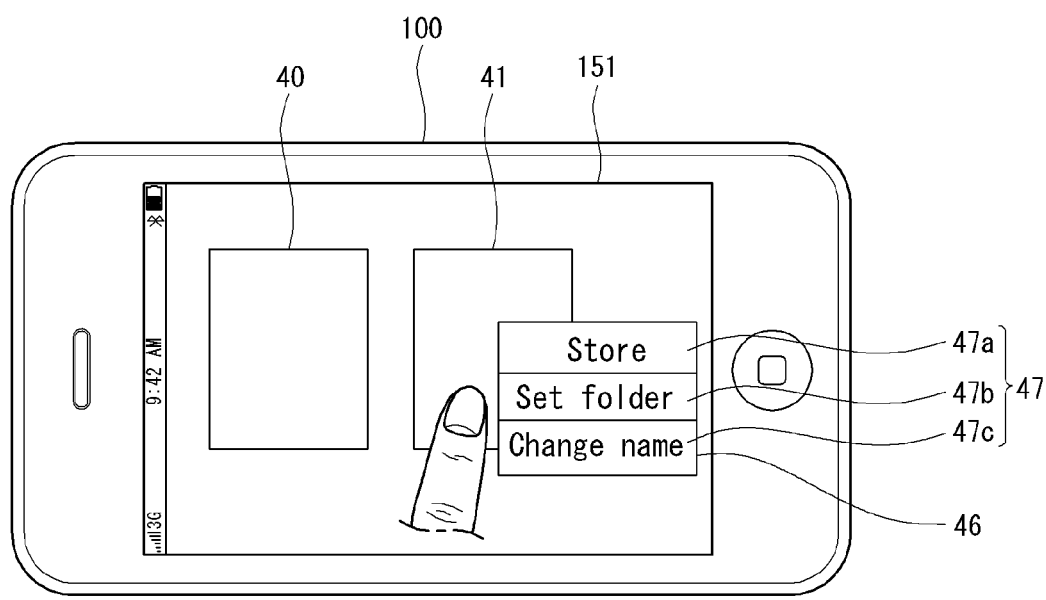

Referring to FIG. 13, when the user inputs a touch signal corresponding to the object 41, the controller 180 can display a menu window 46 related to the operation S140 on the touch screen 151. For example, the menu window 46 can include a storage menu 47a corresponding to a storage command, a folder setting menu 47b for setting a storage position, and a name change menu 47c for changing a file name. The touch signal corresponding to the object 41 may be set as a touch signal having a specific pattern, such as a long touch signal corresponding to a touch maintained for a predetermined time or a double touch signal corresponding to at least two continuous touches performed within a predetermined time.

The operation described with reference to FIG. 13 can be also performed on the image 40 captured in the operation S100.

When the controller 180 stores both the image 40 and the object 41, the controller 180 may respectively store the image 40 and the object 41 in predetermined different folders if storage positions are not designated by the user.

The controller 180 may store information on a connection between the image 40 and the object 41 or information on a relationship between the image 40 and the object 41 when storing both the image 40 and the object 41. When one of the image 40 and the object 41 is retrieved from the memory 160, the controller 180 may also retrieve the other of the image 40 and the object 41 with reference to the connection information or relationship information and display the image 40 and the object 41 together. For example, when the user commands the mobile terminal 100 to display the image 40 on the touch screen 151, the controller 180 can display the object 41 as well as the image 40 on the touch screen 151.

Figure 14:
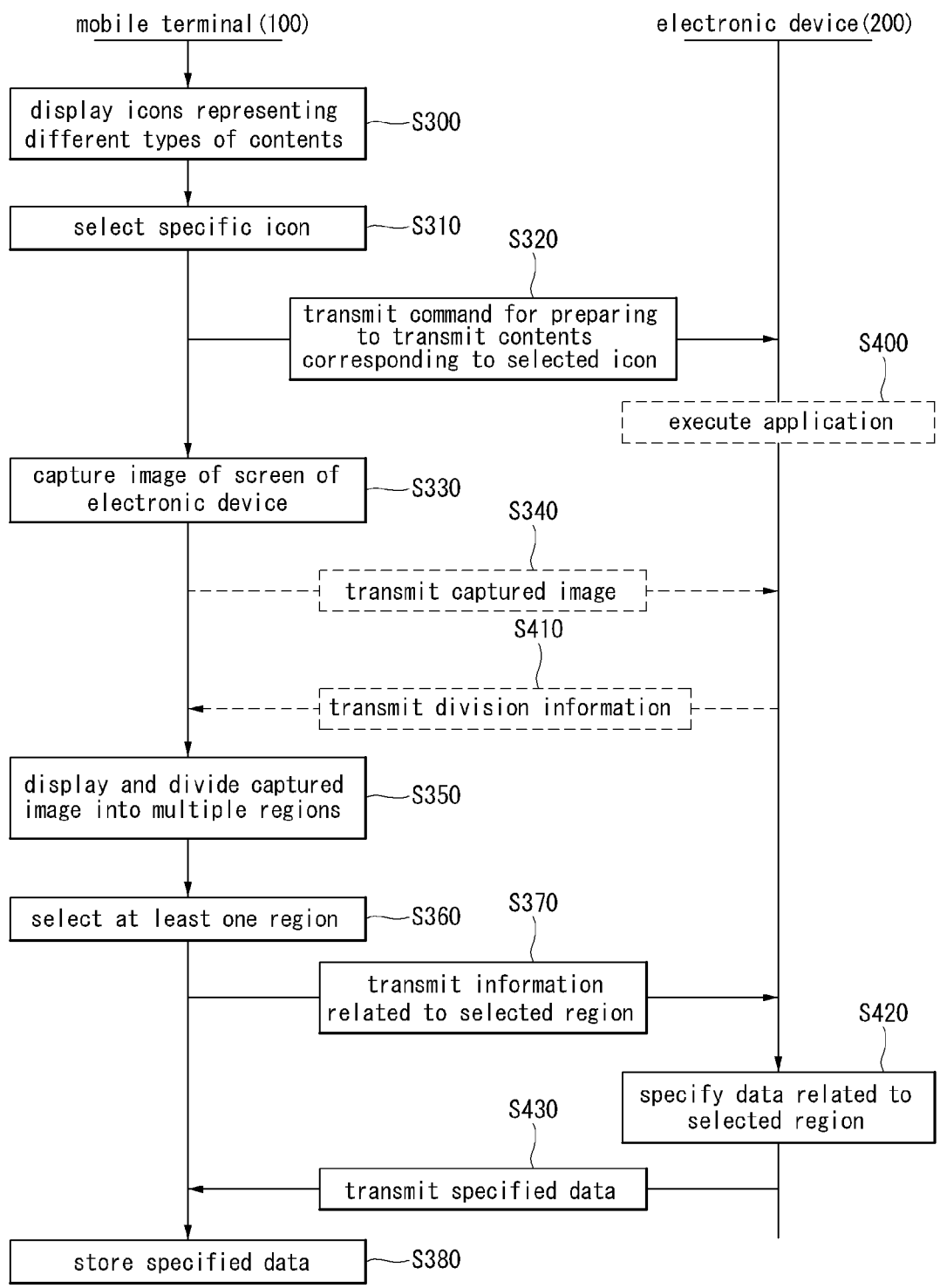
FIG. 14 is a flowchart illustrating another implementation of a method of transmitting and receiving data of this document.

FIG. 14 is a flowchart illustrating another implementation of a method of transmitting and receiving data of this document and FIGS. 15, 16, 17 and 18 are views for explaining the method of transmitting and receiving data shown in FIG. 14.

The method of transmitting and receiving data shown in FIG. 14 may be implemented in the system environment including the mobile terminal 100 and the electronic device 200, described above with reference to FIGS. 1, 2 and 3. The method of transmitting and receiving data and the operations of the mobile terminal 100 and the electronic device 220 for implementing the method will now be explained in detail.

The controller 180 of the mobile terminal 100 may display multiple icons respectively representing different types of contents on the touch screen 151 in operation S300.

Figure 15:
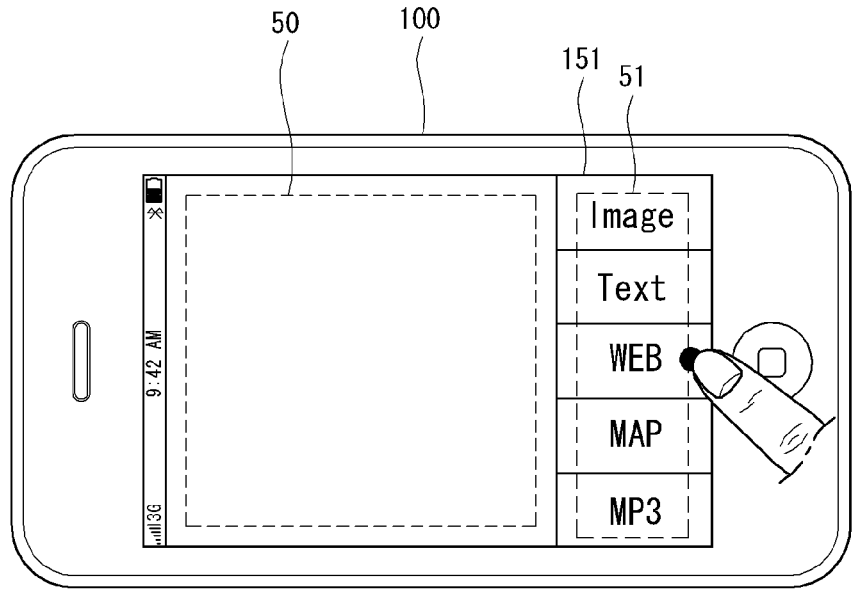
FIGS. 15, 16, 17 and 18 are views for explaining the method of transmitting and receiving data shown in FIG. 14.

Referring to FIG. 15, the controller 180 can display an icon group 51 representing different types of contents such as image, text, web, map, and MP3 on the touch screen 151.

The operation S300 may be performed when the mobile terminal 100 enters a camera preview mode. In FIG. 15, reference numeral 50 represents a camera preview area.

The controller 180 may receive a signal for selecting a specific icon included in the icon group 51 in operation S310. In FIG. 15, the user selects "WEB". When the specific icon is selected, the controller 180 may enter a mode of transmitting and receiving contents corresponding to the specific icon. That is, the controller 180 may change the current display screen to a screen relating to transmission and receiving of the contents corresponding to the specific icon.

The controller 180 of the mobile terminal 100 may transmit a command to the electronic device 200 to prepare the transmission of the contents corresponding to the selected icon in operation S320.

The electronic device 200 may execute a related application to prepare the transmission of the contents corresponding to the selected icon according to the command received from the mobile terminal 100 in operation S400.

For example, the electronic device 200 can activate only the contents corresponding to the selected icon among contents currently called, played or activated or display the contents corresponding to the selected icon on a specific region of the screen.

Furthermore, the electronic device 200 can previously specify or determine the contents corresponding to the selected icon.

The controller 180 of the mobile terminal 100 may capture an image of the screen of the electronic device 200 through the camera 121 in operation S330. The operation S330 may correspond to the operation S100 shown in FIG. 4.

The controller 180 may display the captured image on the touch screen 151. In addition, the controller 180 may divide the displayed image into multiple regions in operation S350.

Figure 16:
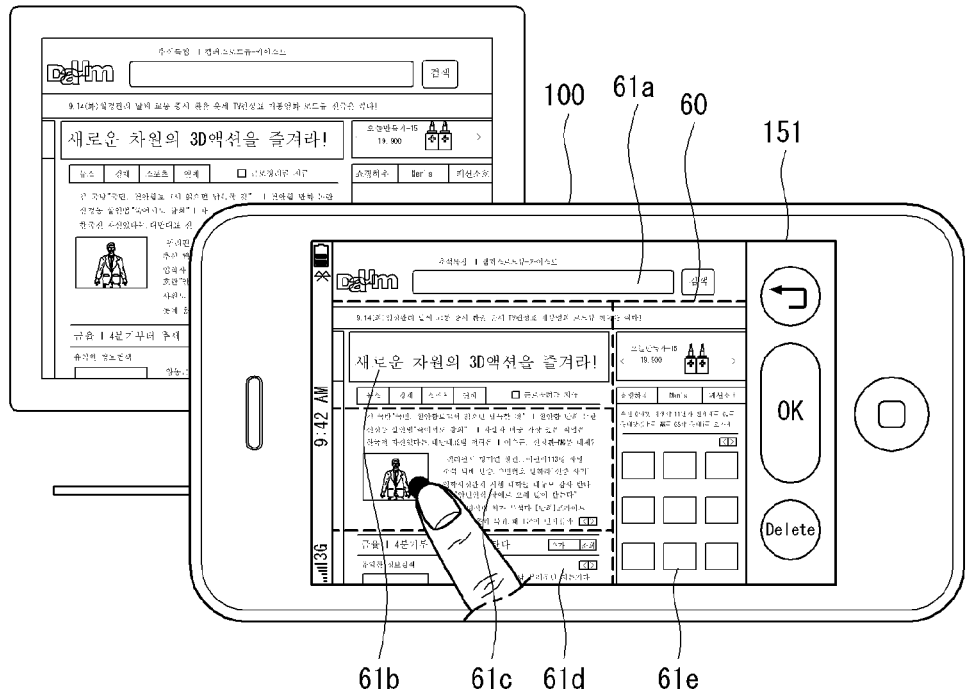

Referring to FIG. 16, the controller 180 can divide the image displayed on the touch screen 151 into five regions 61a, 61b, 61c, 61d and 61e using a splitting line 60.

The controller 180 may perform the operation S350 in various manners. In an implementation, the controller 180 transmits the image captured in the operation S330 to the electronic device 200 in operation S340. The electronic device 200 receives the captured image, acquires division information for dividing the received image into multiple regions from the mobile terminal 100 with reference to the captured image and the image displayed on the display unit 210, and transmits the division information to the mobile terminal 100 in operation S410. The controller 180 of the mobile terminal 100 performs the operation S350 using the division information received from the electronic device 200.

In another implementation, the controller 180 recognizes the image captured in the operation S330 as multiple objects using the object recognition algorithm or an image analysis algorithm and divides the captured image into multiple regions such that the recognized objects can be discriminated from one another.

The controller 180 of the mobile terminal 100 may receive a signal for selecting at least one of the regions 61a, 61b, 61c, 61d and 61e in operation S360.

Referring to FIG. 16, the user touches a specific region 61c among the regions 61a, 61b, 61c, 61d and 61e by a finger to select the specific region 61c. When the region 61c is selected, the controller 180 can magnify the selected region 61c and display the magnified region on the touch screen 151, as shown in FIG. 17.

The controller 180 may transmit information related to the selected region 61c to the electronic device 200 in operation S370. The operation S370 may correspond to the operation S130 shown in FIG. 4. For example, the information related to the selected region 61c can include the image corresponding to the selected region 61c, text information representing the selected region 61c and other identifiers.

The electronic device 200 may specify data related to the selected region by using the information related to the selected region, received from the mobile terminal 100, in operation S420.

Figure 17:
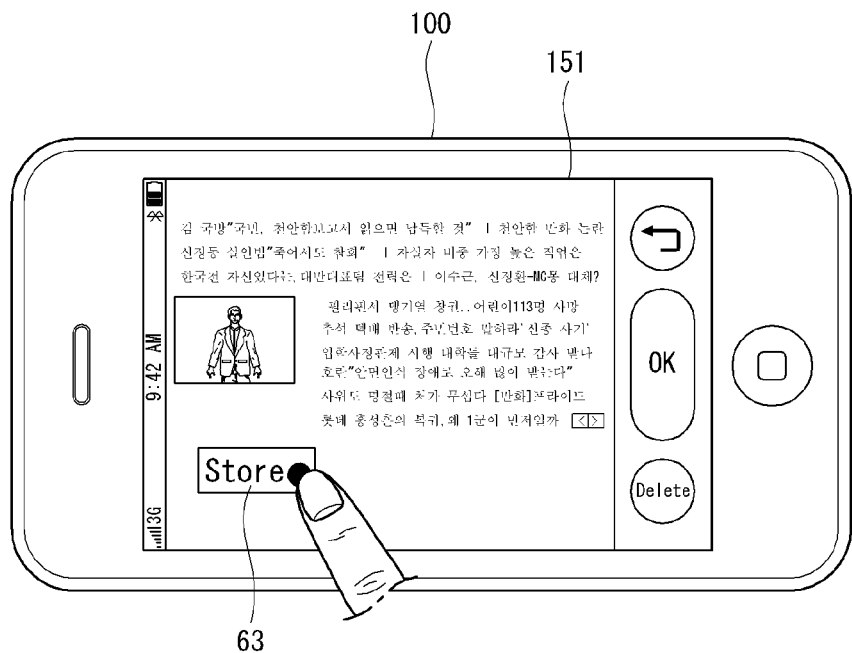

Referring to FIGS. 16 and 17, the electronic device 200 can specify contents corresponding to the specific region 61c selected by the user, for example, a link address, image, video, audio, text, etc. included in the specific region 61c, as the data related to the specific region 61c. The data related to the specific region 61c may include the specific region 61c or the Internet address (URL) of a web page including the specific region 61c.

The electronic device 200 may transmit the specified data to the mobile terminal 100 in operation S430.

The controller 180 of the mobile terminal 100 may store the specified data received from the electronic device 200 in operation S380. The operation S380 may correspond to the operation S140 shown in FIG. 4.

As shown in FIGS. 15, 16 and 17, when the user selects "WEB" from the icon group 51 in operation S310, the electronic device 200 can include the Internet address or Internet access route in the specified data and transmit the specified data to the mobile terminal 100.

When the mobile terminal 100 receives the data including the Internet address or Internet access route from the electronic device 200, the mobile terminal 100 may store the contents and the Internet address included in the specified data in such a manner that the contents and the Internet address are linked to each other or independently store the contents and the Internet address.

Figure 18:
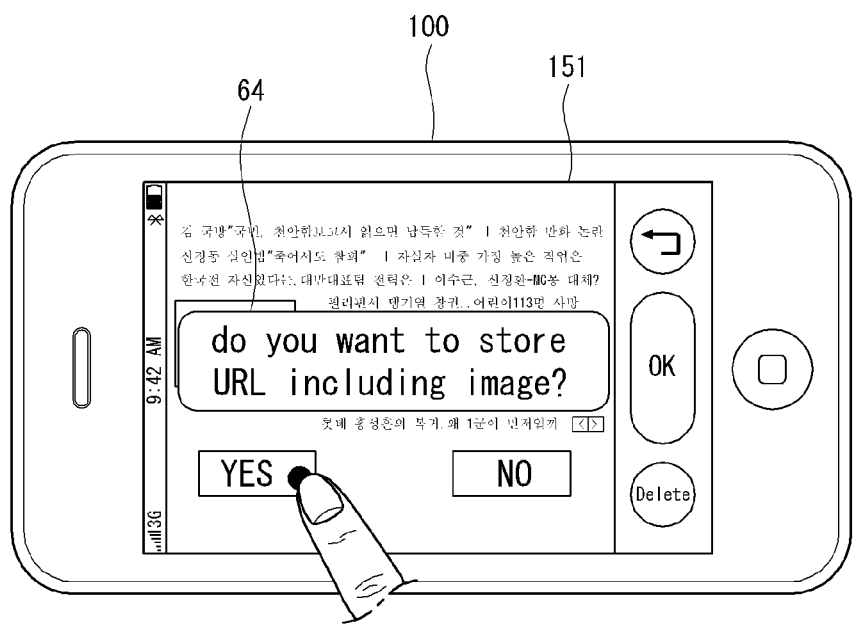

Referring to FIG. 18, the controller 180 can provide a user interface including text that inquires whether a specific image included in the selected specific region 61c and an access route for accessing the specific region 61c or the web page including the specific region 61c should be stored together.

Figure 19:
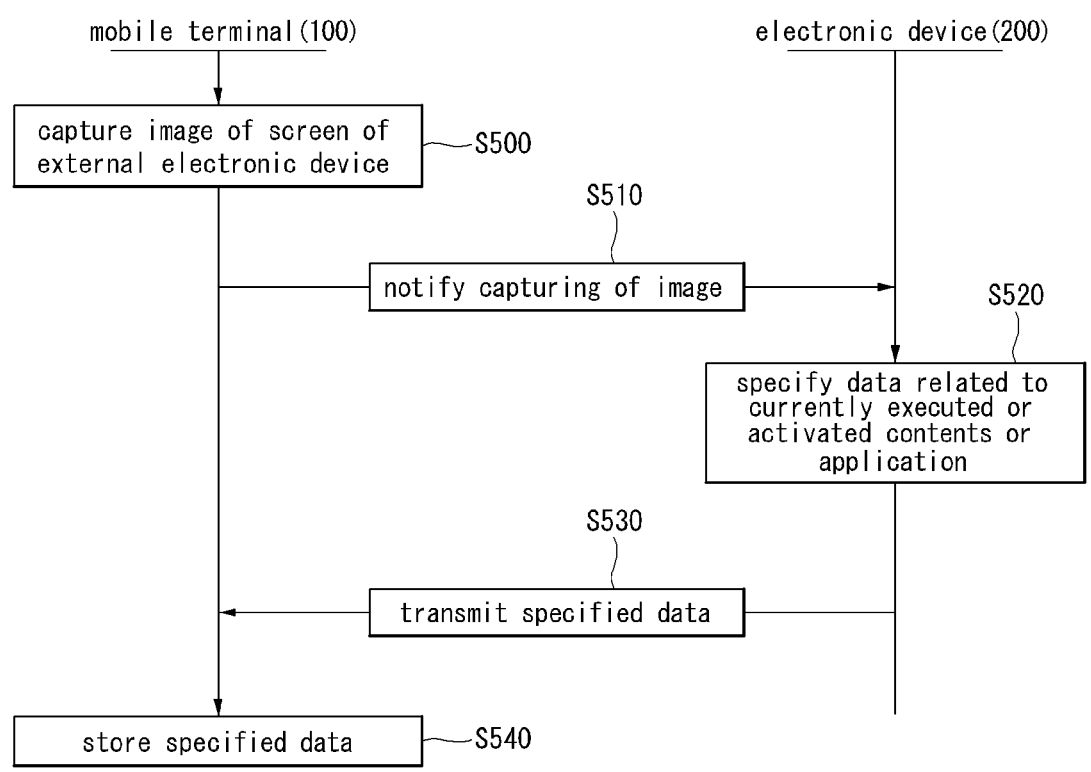
FIG. 19 is a flowchart illustrating another implementation of a method of transmitting and receiving data of this document.
Figure 20:
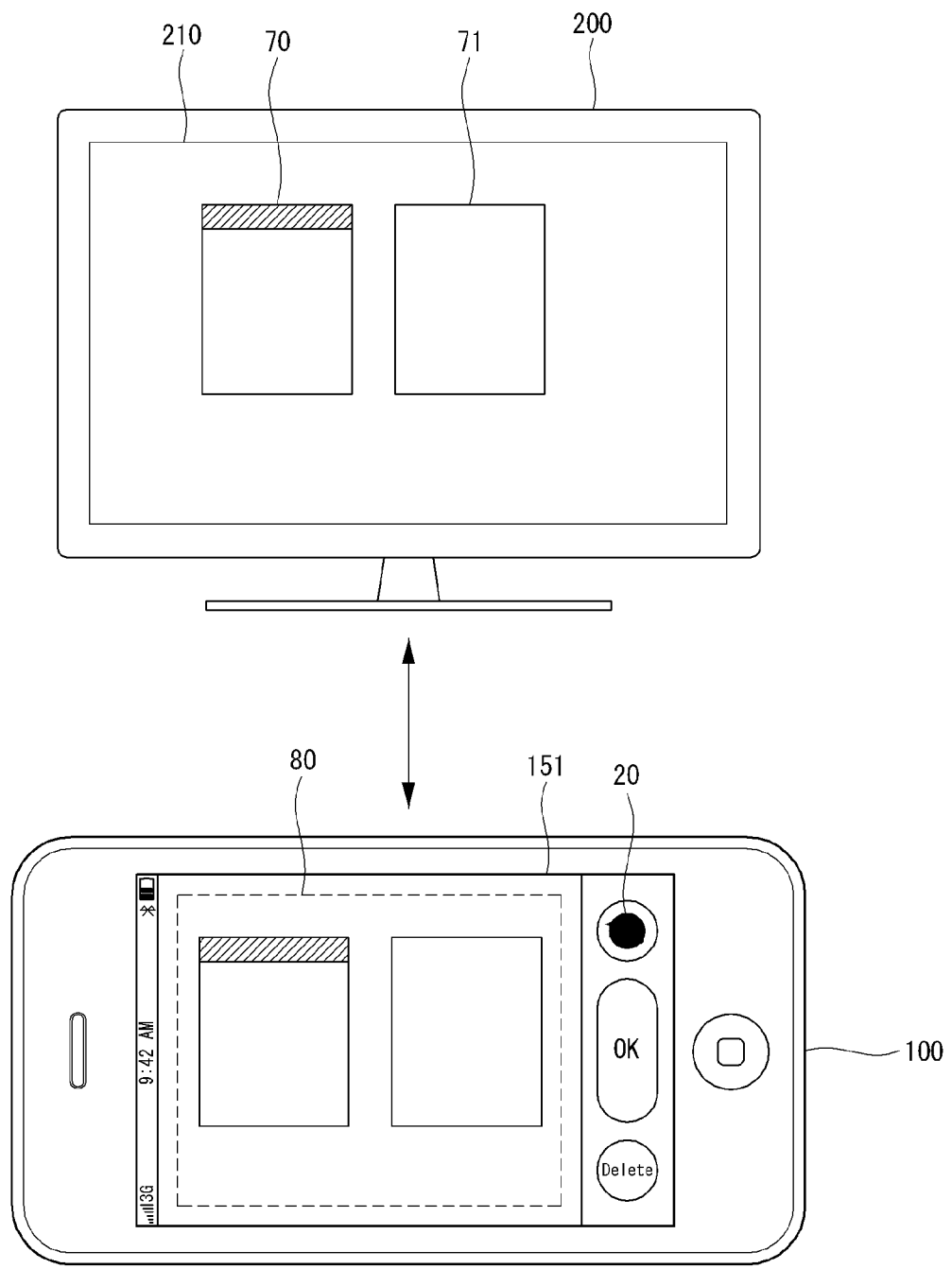
FIG. 20 is a view for explaining the method of transmitting and receiving data shown in FIG. 19.

FIG. 19 is a flowchart illustrating another implementation of a method for transmitting and receiving data of this document and FIG. 20 is a view for explaining the method of transmitting and receiving data shown in FIG. 19.

The method of transmitting and receiving data shown in FIG. 19 may be implemented in the system environment including the mobile terminal 100 and the electronic device 200, described above with reference to FIGS. 1, 2 and 3. The method of transmitting and receiving data and the operations of the mobile terminal 100 and the electronic device 200 for implementing the method will now be explained in detail.

The controller 180 of the mobile terminal 100 may capture an image of the screen of the external electronic device 200 through the camera 121 in operation S500. The operation S500 may correspond to the operation S100 shown in FIG. 4.

Referring to FIG. 20, the controller 180 can capture an image 80 including objects 70 and 71 displayed on the screen of the electronic device 200 through the camera 121 and display the image 80 on the touch screen 151.

The controller 180 may notify the electronic device 200 that the image 80 is captured in operation S510.

The electronic device 200 may specify data related to contents or an application currently executed or activated therein when the electric device 200 is notified that the mobile terminal 100 captures the image 80 in operation S520.

In FIG. 20, the first object 70 displayed on the display unit 210 of the electronic device 200 is activated and the second object 71 displayed on the display unit 210 is temporarily inactivated due to the activation of the first object 70. Accordingly, the electronic device 200 can specify data related to the first object 70 corresponding to an activated object as data to be transmitted to the mobile terminal 100.

The electronic device 200 may transmit the data specified in the operation S520 to the mobile terminal 100 in operation S530.

The mobile terminal 100 may store the specified data received from the electronic device 200 in operation S540. The operation S540 may correspond to the operation S140 shown in FIG. 4.

The above-described method of transmitting and receiving data may be written as computer programs and may be implemented in digital microprocessors that execute the programs using a computer readable recording medium. The method of transmitting and receiving data may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Other implementations are within the scope of the following claims.

What is claimed is:

1. A mobile terminal comprising:
a wireless communication unit configured to transmit and receive information;
a touch screen configured to display information;
a camera configured to capture images; and
a controller configured to:
control the camera to capture an image of a screen of an external electronic device displaying at least one object;
control the touch screen to display the captured image;
recognize one or more objects of the captured image;
receive a touch input via the touch screen for selecting an object of the recognized one or more objects from the displayed captured image;
cause transmission of information related to the selected object to the external electronic device;
receive a file related to the selected object from the external electronic device via the wireless communication unit.

2. The mobile terminal of claim 1, wherein the controller is further configured to:
control the touch screen to display a tool for selecting one of the at least one object.

3. The mobile terminal of claim 1, wherein the controller is further configured to:
divide the displayed image into multiple regions, each region comprising an object of the one or more recognized objects; and
select an object of the recognized one or more objects in response to a selection of a corresponding region from the multiple regions.

4. The mobile terminal of claim 1, wherein the controller is further configured to:

control the touch screen to display multiple icons, each of the multiple icons representing a different type of content; and receive content from the external electronic device, the content corresponding to an icon selected from the displayed multiple icons.

5. The mobile terminal of claim 1, wherein the controller is further configured to:

control the touch screen to display a soft key during an activation mode of the camera; and receive the file from the external electronic device in response to selection of the soft key.

6. The mobile terminal of claim 5, wherein the controller is further configured to control the touch screen to vary a display state of the soft key such that the display state reflects a status of receiving the file.

7. A method of receiving data in a mobile terminal, the method comprising:

capturing an image of a screen of an external electronic device;

displaying the captured image;

recognizing one or more objects included in the captured image;

receiving a touch input for selecting an object of the recognized one or more objects from the displayed captured image;

transmitting information related to the selected object to the external electronic device; and receiving a file related to the selected object from the external electronic device.

8. The method of claim 7, wherein displaying the captured image comprises displaying a tool for selecting the object included in the captured image.

9. The method of claim 7, further comprising:

dividing the displayed captured image into multiple regions, each region comprising an object of the one or more recognized objects;

wherein the received touch input comprises an input selecting one of the multiple regions.

10. The method of claim 7, further comprising:

displaying multiple icons, each of the multiple icons representing a different type of content; and receiving content from the external electronic device, the content corresponding to an icon selected from the displayed multiple icons.

11. The method of claim 10, wherein:

displaying the multiple icons comprises displaying a soft key during an activation mode of the camera; and the content is received from the external electronic device in response to selection of the soft key.

12. The method of claim 11, further comprising varying a display state of the soft key such that the display state reflects a status of receiving the file.

13. A mobile terminal comprising:

a wireless communication unit configured to transmit and receive information;

a touch screen configured to display information;

a camera configured to capture images; and a controller configured to:

control the camera to capture an image of a screen of an external electronic device, request content depicted in the captured image from the external electronic device; and receive a file from the external electronic device, the file related to the requested content or an application that is executed or activated in the external electronic device.

14. A method of receiving data in a mobile terminal, the method comprising:

capturing an image of a screen of an external electronic device;

requesting content depicted in the captured image from the external electronic device; and receiving a file from the external electronic device, the file related to the requested content or an application that is executed or activated in the external electronic device.

15. A method of transmitting and receiving data in an electronic system including a mobile terminal and an electronic device, the method comprising:

capturing, by the mobile terminal, an image of a screen of the electronic device;

recognizing, by the mobile terminal, one or more objects depicted in the captured image;

receiving, by the mobile terminal, a signal for selecting an object of the one or more recognized objects included in the captured image;

transmitting, by the mobile terminal, information related to the selected object to the electronic device, the information comprising at least selection information related to the selected object or the captured image;

specifying, by the electronic device, data related to the selected object by using the transmitted information;

transmitting, by the electronic device, the specified data to the mobile terminal; and receiving and storing, by the mobile terminal, the transmitted specified data.

16. The method of claim 15, further comprising:

notifying the electronic device, by the mobile terminal, that the image is captured.

17. The mobile terminal of claim 5, wherein the controller is further configured to control the wireless communication unit to connect the mobile terminal and the external electronic device in response to the selection of the soft key.

18. The mobile terminal of claim 1, wherein the controller is further configured to:

control the touch screen to display the received file, the captured image, and a soft key, wherein the received file and the captured image are selectable by a user input;

receive a user input selecting at least the received file, or captured image; and store the selected at least received file or captured file in response to a user input via the displayed soft key.

19. The mobile terminal of claim 1, wherein the transmitted information comprises at least one of an image and text related to the selected object.

20. The mobile terminal of claim 1, wherein the transmitted information comprises identification information for identifying the specific object.

* * * * *